May 18, 1965     C. H. YOUNG     3,184,261
COLLAPSIBLE AND EXTENDABLE STANDARD
Filed Oct. 18, 1963
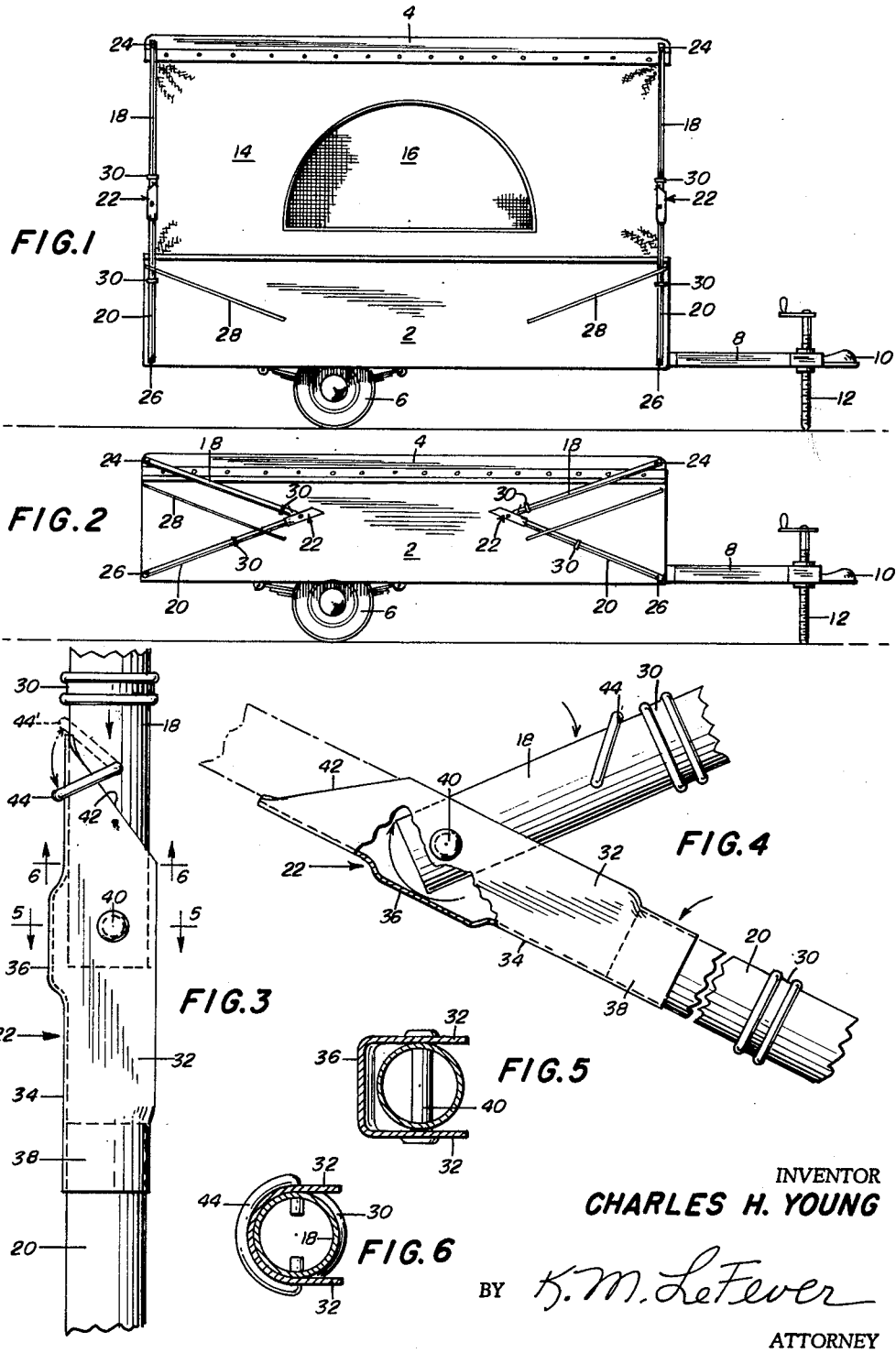
INVENTOR
CHARLES H. YOUNG
BY K. M. LeFever
ATTORNEY

United States Patent Office 3,184,261
Patented May 18, 1965

3,184,261
COLLAPSIBLE AND EXTENDABLE STANDARD
Charles H. Young, 10461 Glenwood, Osceola, Ind.
Filed Oct. 18, 1963, Ser. No. 317,321
5 Claims. (Cl. 296—26)

This invention relates to support means and particularly to supporting means which may be collapsed and extended. More particularly the invention relates to collapsible and extendable support means which are designed to be locked in place in their extended position. Still more particularly the invention relates to collapsible and extendable support means which have utility for vehicles and the like designed with roof members which may be raised and lowered to increase and decrease headroom.

With respect to vehicles represented by trailers, particularly camping trailers designed for periodic use, it has been found that a design which permits the roof of the camper to be lowered during periods of transportation is very desirable from the standpoint of economy in transportation due to lowered wind resistance, increased roadability, stability, and the like. After being towed to the camping area in the lowered position it is desired that the headroom necessary for occupancy be increased. This is ordinarily accomplished by elevating the roof member and supporting it in the elevated position by means of standards.

The instant invention is directed towards support means which may be quickly and easily extended from their collapsible position and locked into the extended position.

Briefly stated the instant invention is directed towards collapsible and extendable support means which comprise an upper and lower support member pivotally connected to a locking sleeve. When in the extended position the support members are simply and easily locked in position by a locking means which is an integral part of the upper support member. The locking means may be quickly disengaged and the support collapsed by pivoting about the pivotal point of attachment in a manner hereinafter to be described.

The invention will be more clearly explained by referring to the attached drawing in which FIG. 1 represents a side view of a vehicle with the roof member elevated and showing two of the support members of the invention in their extended position, FIG. 2 is a side view of the same vehicle with the roof member collapsed and showing two of the support members in their collapsed position, FIG. 3 represents a detailed view of the locking sleeve with the support members in their extended position as in FIG. 1, FIG. 4 represents a detailed view of the locking sleeve showing the support members in their collapsed position as in FIG. 2, FIG. 5 is a cross-sectional view taken along the line 5—5 of FIG. 3, and FIG. 6 is a cross-sectional view taken along the line 6—6 of FIG. 3.

Turning now to the drawing reference numeral 2 designates a body portion of a vehicle (a camper trailer is shown) having an extendable roof member 4, wheels 6, bottom frame 8, towing device 10, and a support mechanism 12. A canvas or other fabric material 14 furnishes the side walls of the extended trailer which may be fitted with a window of gauze material shown at 16.

The supporting members of the roof comprise an upper support member 18, a lower support member 20, and a locking sleeve 22. The upper support member is pivotally attached to the roof member as shown at 24 and the lower portion of the lower support member is pivotally attached to the bottom of the body portion as shown at 26. The guide members shown at 28 prevent lateral displacement of the support members during the collapsing or extending operation. Rubber grommet rings 30 surround each support member to cushion the support members when in either collapsed or extended relation.

Locking sleeve 22 comprises two side portions 32 and a bottom portion 34. The side portions are essentially perpendicular to the bottom portion leaving the top of the locking sleeve open for the collapsing operation. The bottom portion 34 contains a recess shown at 36. Lower support member 20 is permanently attached to the lower portion of locking sleeve 22 by means of welding, crimping or a combination of these two as shown at 38. Upper support member 18 is pivotally attached to locking sleeve 22 by means of pivoting pin 40 at a position such that recess 36 will accommodate the lowered end of support member 18 during the collapsing operation. The upper portion of the sides of locking sleeve 22 are biased or cut at an angle with the horizontal axis thereof as shown at 42. Fitted in support member 18 is locking means 44. This locking means shown as a D-ring in the drawing is positioned so that when the support members are in their extended relation, locking ring 44 is slipped over the top of the locking sleeve 22, thus locking the support members in their extended position. When in the extended position rubber grommet 30 on support member 18 may be slipped downward against locking sleeve 22 thus preventing locking means 44 from becoming disengaged.

To collapse the support means, locking means 44 pivots to the position shown at 44' in FIG. 3 and then support member 18 and 20 are allowed to pivot about their point of pivotal attachment 40.

To review briefly the instant invention relates to a collapsible and extendable standard which may be of tubular construction, a solid rod, a square channel or any support material desired. The standard comprises an upper and lower support member which are pivotally joined in a locking sleeve. Preferably the lower support standard is an integral part of the locking sleeve and the upper standard is pivotally attached to said sleeve by means of a pivoting pin. If desired, however, the locking sleeve may be an integral part of the upper support member and the lower support member may be pivotally attached to said sleeve. The locking sleeve is equipped with locking means for locking the support members in their extended position.

It will be understood, of course, that other embodiments of the inventive concept may be designated by those familiar with the art without departing from the spirit of the instant invention.

What is claimed is:

1. A collapsible and extendable standard which comprises an upper and lower support member pivotally joined by a locking sleeve, one of said support members being permanently affixed to one end of said sleeve the other of said support members being pivotally attached to said sleeve, said sleeve having a free end extending over said pivotally attached support member, the latter support member including a locking ring pivotally mounted thereon at a position such that the free loop thereof may be placed over the free end of said locking sleeve when said support members are in a position such that they are extensions of each other.

2. A collapsible and extendable standard which comprises a pair of support members joined together by a locking sleeve having a tapered free end, one of said support members being permanently and rigidly attached to said locking sleeve, the other of said support members being pivotally attached to said locking sleeve by a pivoting pin extending through the sides of said sleeve, a D-ring pivotally fastened to said pivotally attached support member at a position such that it may be placed around the tapered free end of said locking sleeve when the support members are in an extended position relative to each other.

3. A collapsible and extensible standard for retractable roof surfaces which comprises a pair of support members, a locking sleeve joining said support members, and fastening means for locking said support members in their extended position, said locking sleeve having a bottom and a pair of sides substantially perpendicular thereto, one end of said locking sleeve being rigidly affixed to the end of the first of said support members, the end of the second of said support members being pivotally attached to the sides of said locking sleeve, the bottom of said locking sleeve being recessed to accommodate the end of said second support member during rotation about the point of pivotal attachment, the top of said side members of said locking sleeve terminating in angle, and a D-ring pivotally attached to said second support member in a position such that it may be slipped over the angle portions of the sides of said locking sleeve when the support members are in their extended position.

4. A collapsible standard which comprises a first tubular member, a locking sleeve permanently affixed thereto, said locking sleeve having a bottom and two sides substantially perpendicular thereto, said sides terminating at an angle at the upper portions thereof, said bottom having a recess therein, said sides having a pivoting pin therethrough at a position opposite said recess, a second tubular member pivotally attached to said locking sleeve by means of said pivoting pin, a D-ring pivotally attached to said second tubular member at a position such that it may be slipped over said angled portion of said sides when the horizontal axis of said first tubular member and said second tubular member are in the same plane.

5. A vehicle having a collapsible and extensible roof and a body, each corner of said roof being attached to the body by a pair of collapsible and extensible standards which comprises an upper and lower support member pivotally joined by a locking sleeve, one of said support members being permanently affixed to one end of said sleeve the other of said support members being pivotally attached to said sleeve, the latter support member including a lock ring pivotally mounted therein at a position such that the free loop thereof may be placed over the locking sleeve when said support members are in a position such that they are extensions of each other, and guiding means affixed to said body for controlling lateral movement of said support members during collapsing and extension.

References Cited by the Examiner
UNITED STATES PATENTS

| | | | |
|---|---|---|---|
| 2,037,988 | 4/36 | Larsen | 280—36 |
| 2,806,708 | 9/57 | Finstad | 280—36 |
| 2,880,011 | 3/59 | Peterson | 280—36 |
| 3,048,438 | 8/62 | Koch | 296—27 |

FOREIGN PATENTS 593,863  10/47  Great Britain.

MILTON BUCHLER, *Primary Examiner.*

A. HARRY LEVY, *Examiner.*